United States Patent [19]

Nalbone

[11] Patent Number: 4,790,004

[45] Date of Patent: Dec. 6, 1988

[54] IMPLIED PRINCIPAL BUSY STATUS INDICATOR FOR COVERED CALLS

[75] Inventor: Robert D. Nalbone, Boulder, Colo.

[73] Assignee: American Telephone and Telegraph Company, AT&T Information Systems, Holmdel, N.J.

[21] Appl. No.: 940,141

[22] Filed: Dec. 10, 1986

[51] Int. Cl.$^4$ .................. H04M 3/22; H04M 3/54
[52] U.S. Cl. ........................... 379/214; 379/218; 379/267
[58] Field of Search ............... 379/211, 210, 213, 214, 379/215, 164, 157, 165, 267, 218

[56] References Cited

U.S. PATENT DOCUMENTS

| | | | |
|---|---|---|---|
| 4,256,928 | 3/1981 | Lesea et al. | 379/214 |
| 4,436,963 | 3/1984 | Cottrell et al. | 379/211 |
| 4,567,324 | 1/1986 | Smith et al. | 379/210 |
| 4,634,811 | 1/1987 | Curtin et al. | 379/211 |
| 4,701,950 | 10/1987 | Curtin et al. | 379/214 |

OTHER PUBLICATIONS

"Diavox Courier 700, Digital System Telephone for MD110", J. Reinius et al., *Ericsson Review*, No. 2, 1982, pp. 58–66.

*Primary Examiner*—Thomas W. Brown
*Attorney, Agent, or Firm*—James M. Graziano; John C. Moran

[57] ABSTRACT

The subject implied principal busy status indicator provides all covering users with an indication of the busy/idle status of the principal's line on a covered call. This is accomplished by equipping each covering user's telephone station set with a principal busy status indicator for every line appearance on the covering user's telephone station set. When a covered call is diverted from a principal's line to the covering user's telephone station set, the line appearance on which the covered call appears is lighted and the principal busy status indicator associated with the covering user's line appearance indicates the busy/idle status of the principal's line. The business communication system updates the state of the principal busy status indicator so the covering user knows when the called principal's line is idle.

4 Claims, 13 Drawing Sheets

IMPLIED PRINCIPAL BUSY STATUS INDICATOR FOR COVERED CALLS

FIELD OF THE INVENTION

This invention relates to business communication systems and, in particular, to a busy status indicator for covered calls.

PROBLEM

The problem with existing call coverage arrangements is that they provide a principal busy/idle status indication only on the telephone station set of the primary covering user. If the primary covering user is unavailable, the call is redirected to a secondary or tertiary coverage point where the covering user receives no indication of the busy/idle status of the principal's line. This is especially a problem when the calling party wishes to hold until the called principal's line is idle.

SOLUTION

This problem is solved and a technical advance achieved by the subject implied principal busy status indicator which provides all covering users with an indication of the busy/idle status of the principal's line on a covered call. This is accomplished by equipping each covering user's telephone station set with a principal busy status indicator for every line appearance on the covering user's telephone station set. When a covered call is diverted from a principal's line to the covering user's telephone station set, the line appearance on which the covered call appears is lighted and the principal busy status indicator associated with the covering user's line appearance indicates the busy/idle status of the principal's line. The business communication system updates the state of the principal busy status indicator so the covering user knows when the called principal's line is idle.

In a business communication system, a set of call coverage criteria is stored in memory to specify the conditions under which calls directed to a principal's telephone line are redirected to coverage. The identity of a first call coverage point for the principal's telephone line is also stored in memory. In addition, the identities of one or more alternate call coverage points for the principal's telephone line are stored along with an indication of the order of preference of the call coverage points. The coverage criteria are examined by the business communication system in response to a call to the principal's telephone station set and, at such time as a criterion is satisfied, the call is redirected to the primary call coverage point. If the call remains unanswered at the primary call coverage point for a prescribed period of time, the business communication system automatically redirects the incoming call from the primary call coverage point sequentially to each of the other call coverage points in the specified order of preference until the call is either answered or abandoned.

In a business communication system, the primary coverag point for the principal's telephone station set is typically equipped with sufficient line appearances and busy/idle indicators to provide an indication of the busy/idle status of the principal's telephone line. In the case where the primary call covering user is covering for a large number of principals, or in the case where the covering user is a secondary or tertiary call coverage point, rhe business communication system typically does not provide an indication of the busy/idle status of the principal's line on the covering user's telephone station set. Therefore, the covering user in these two cases does not have any indication of the busy/idle status of the princial's telephone line.

The subject principal busy status indicator enables the business communication system to provide a busy/idle status indication to the covering user regardless of whether they are the secondary or tertiary coverage point or whether they are covering for a large number of principals. This is accomplished by using the implied princial capability of the business communication system as well as an additional visual indicator to convey the busy/idle status of the principal's line to the covering user. The telephone station set of the covering user is equipped with an additional indicator for each of the standard call appearances that appear on a covering user's telephone station set. Thus, when a call is redirected to the telephone station set of the covering user, it is directed to one of the standard call appearances on that telephone station set. The telephone station set of the covering user provides a visual indication of the active call appearance and the ringing, busy or idle status of that call appearance. The additional visual indicator associated with this call appearance is controlled by the business communication system to indicate the status of the principal's telephone line associated with this redirected call. Thus, the covering user is immediately provided with a principal busy/idle status indication by the business communication system associated with a redirected/covered call appearing on one of the standard call appearances on the covering user's telephone station set. In this fashion, the covering user is provided with a status indication regardless of whether the covering user is the secondary or tertiary coverage point and regardless of how many principals the covering user must provide coverage for.

DETAILED DESCRIPTION

Figure 1:
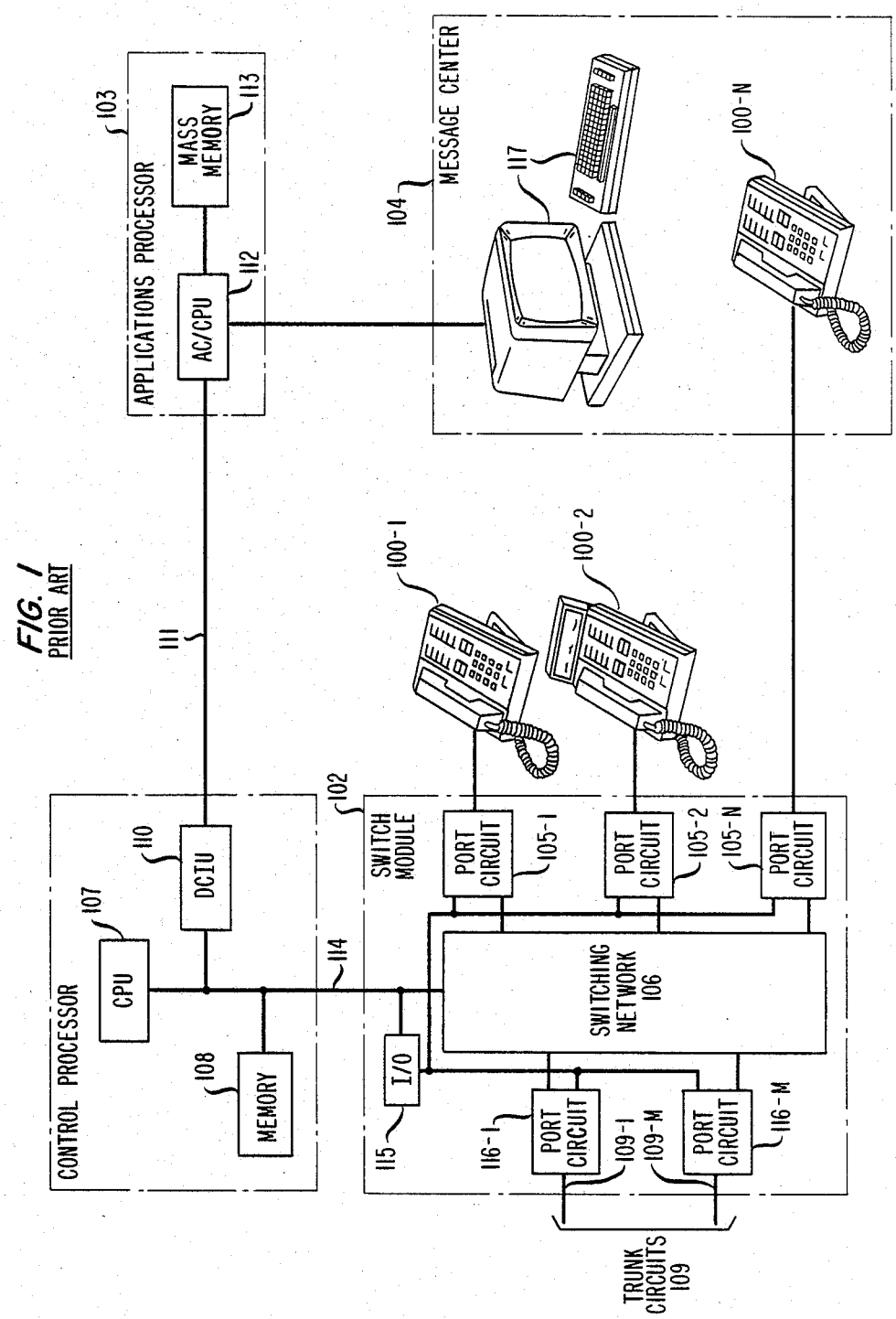
FIG. 1 shows a block diagram of an illustrative business communication, system in which the invention might be practiced.

The invention is illustratively embodied in a business communication system which provides a comprehensive call coverage arrangement, including a busy status indication for covered calls. FIG. 1 shows one business communications system in which the present invention may be embodied The business communication system includes four major components—control processor 101, switch module 102, applications processor (AP) 103 and message center (MC) 104. Control processor 101 includes a central processing unit (CPU) 107, which might be any of a number of commercially available processors. Central processing unit 107 uses instructions and data stored in memory 108, to control the major operations of the business communication system. In particular, central processing unit 107 controls the operations of switch module 102 by means of digital communication channel 114. In addition, control processor 101 communicates with applications processor 103 by means of a data connection that includes a digital channel interface unit (DCIU) 110 and a digital data channel 111.

Switch module 102 includes a digital time division switching network 106 that provides time-slot interconnections between internal stations, such as 100-1 to 100-N, and between the internal stations and trunk circuits 109 to a local central office (not shown). Each of the internal stations and trunk circuits connect to switching network 106 by means of interface port circuits 105-1 to 105-N and 116-1 to 116-M respectively. Central processing unit 107 communicates with the internal stations and trunks by means of these port circuits via digital communication channel 114 and input-/output interface circuit 115.

Digital channel interface unit 110 interfaces central processing unit 107 and applications processor 103 over a data access channel. Applications processor 103 comprises its own central processing unit (AP/CPU) 112 which can be implemented by a commercial microprocessor and a mass memory 113 for administering data-intensive features, such as leave word calling (LWC) and message center 104 management. Leave word calling messages, for example, are stored in and retrieved from mass memory 113. A digital channel interface unit program, which is not discussed in detail, controls the transmittal and reception of data to and from the applications processor 103. Mass memory 113 might be any of a number of commercially available memory systems.

Message Center

Message center 104 illustratively serves as a final covering point for calls directed to principal stations. A detailed understanding of the message center 104 is not necessary for an understanding of the invention and message center 104 is only briefly described. The business communications system may have a plurality of message centers although only one is shown for simplicity. An operator position in the message center 104 comprises a telephone station set such as 100-N and a visual display terminal and keyboard 117. Only one of these operator positions is shown in FIG. 1 although a message center may contain several operator positions. The stations of a message center are accessed as part of a uniform call distribution (UCD) group. A call directed to a principal station and which is redirected to message center 104 for coverage arrives at an operator position telephone station set sucn as 100-N. At the same time, central processing unit 100 informs applications processor 103 of the covered call at operator position telephone station set 100-N and the principal station for which the call is intended and the reason for call redirection. In response, applications processor 103 accesses a data file in mass memory 113 pertaining to the principal station and displays information at operator position terminal 117. This displayed information illustratively includes identification of the telephone station set, name of the principal party, the reason the business communication system redirected the call to coverage, and any textual information the principal may have included in the data file. The textual information may include for example, the principal's whereabouts, the time when the principal may return, a message for a particular calling party, and the like. The displayed information at operator position terminal 117 may also include information identifving the calling party.

The displayed information enables the message center operator to answer the call intelligently as if the message center operator were the principal's secretary. The message center operator may input a message from the calling party directly into the principal's data file via operator position terminal 117.

Call Coverage

A set of call coverage criteria is stored in a memory device 108 in the business communication system to specify the conditions under which calls directed to a principal station are redirected to coverage. The identity of a primary call coverage point for the principal's telephone station set is also stored in memory 108 as are the identities of the secondary and tertiary call coverage points with an indication of the order of preference of the call coverage points. The business communication system examines the coverage criteria in response to a call to the principal's telephone station set and, at such time as one of the call coverage criteria is satisfied, the business communication system redirects the call to the primary call coverage point. If the call remains unanswered at the primary call coverage point for a prescribed period of time, the business communication system automatically redirects the call from the primary call coverage point sequentially to each of the other call coverage points in the specified order of preference until the call is either answered or abandoned.

The coverage criteria are comprehensive and may be based on the class of an arriving call as well as the state of the principal's telephone station. In traditional telephone systems, a telephone station set has one line or a plurality of lines, each of which is associated with a different select button. In the present business communication system, a telephone station set may be equipped with either a single line having plural call appearances, each associated with a separate button, or plural lines, each having plural call appearances. Each of these call appearances may simultaneously serve a call, each of which provides a different call function. For example, a telephone station set might have a line with three call appearances on which one call appearance might have a call on hold, the principal might be conversing with a caller on another call appearance, while an incoming call might be ringing on the third call appearance. If one or more of the call appearances of a station line are involved with a call function, the station line is defined to be in an active state. If all the call appearances are active, the station line is defined to be both busy and active. Illustratively, the subject call coverage method operates with respect to a single station line. Thus, a telephone station set that is equipped with plural lines may specify different coverage criteria for each line. To simplify this teaching and as an aid to an understanding of the invention, it is assumed throughout the discussion that each telephone station set served by the business communication system is equipped with a single line which may have plural call appearances, it being understood that the claims are not to be so limited.

With respect to the state of a principal station, and in accordance with one preferred embodiment, a principal may specify that the business communication system redirect incoming calls to coverage only if the principal's telephone station set is "active", or only if the principal's telephone station set is "busy", or only if tee principal's telephone station set is not answered within a specified period of time. With respect to the class of an incoming call, a principal may specify that only calls originated from stations served by the system (internal calls) be redirected to coverage, or that only calls originated from stations not served by the system (external calls) be redirected to coverage. The above call class coverage options may be combined in any way with the telephone station set state coverage options. Thus, if a principal desires, for example, only external calls directed to an "active" telephone station set will be redirected to coverage, and only internal calls directed to a "busy" telephone station set will be redirected.

A principal can activate the "send all calls" (SAC) aspect of coverage by means of a dial access code or, for stations having feature buttons, by operating a dedicated SAC button. In either case, all future calls directed to the telephone station set are redirected to coverage until the feature is deactivated.

Telephone Station Set

Figure 2:
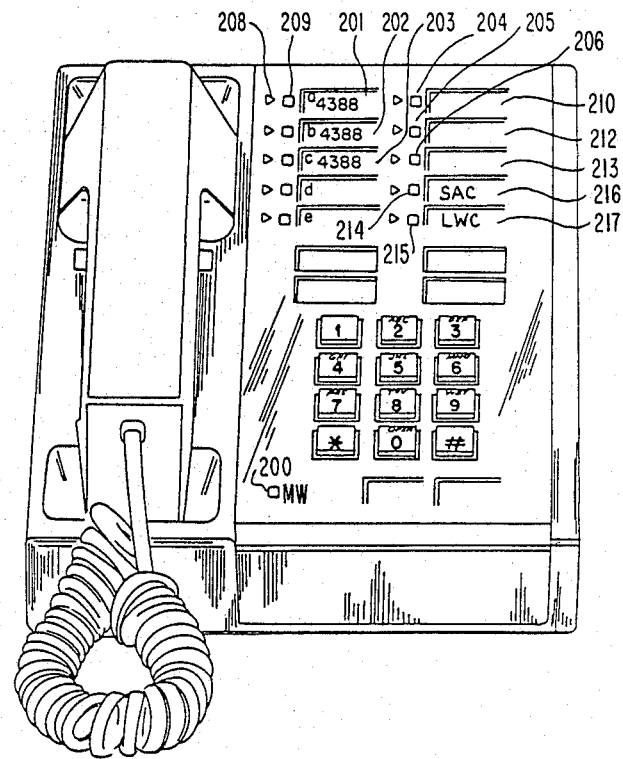
FIGS. 2 and 3 show illustrative telephone stations which are used in the system of FIG. 1.

Illustrated in FIG. 2 is a typical multifunction telephone station set. Telephone station sets used in the illustrative system may be either analog or digital. Special features such as leave word calling (LWC) and send-all-calls (SAC) can be activated from either an analog or digital telephone station set. Feature activation buttons are provided on multifunction telephone stations sets. However, features may be activated by dial access codes (DAC) from any telephone station set. The telephone station set in FIG. 2 has three call appearance select buttons 201 through 203, associated with its single line station number 4388. Independent calls may exist on each of these call appearances simultaneously, although only one call at a time can be in a talking state. Lamps 208 associated with each call appearance are called I-use lamps and reflect a call appearance that has been selected by an operation of the associated select button. Lamps 209 are status lamps and are lit steady or flashing to indicate call appearance status such as ringing, talking and hold states.

In general, most of the buttons on the telephone station set shown in FIG. 2 may be assigned as call appearances or as special feature buttons, as desired. Illustratively, the depicted telephone station set has buttons 216 and 217 assigned as activating buttons for the send all calls and leave word calling features, respectively. When the send all calls feature is activated by operating button 216, all calls that are incoming to the telephone station set, both future calls and calls that are currently arriving, are redirected to coverage according to coverage information stored in the business communication system pertaining to this telephone station set. The send all calls feature is deactivated by operating button 216 a second time. The leave word calling button 217 activates the leave word calling feature. The I-use lamps are not used for these feature buttons. The status lamp 214 associated with the send all calls button is lit steady whenever the feature is activated. Leave word calling status lamp 215 is lit during a call in response to the successful generation and storage of a leave word calling message. Leave word calling status lamp 215 is extinguished at the end of the call. This lamp is fluttered if a leave word calling attempt is unsuccessful or invalid.

If a leave word calling message is successfully generated and stored for the principal associated with the telephone station set in FIG. 2, the principal is alerted of the message by the illumination of message waiting lamp 200 located at the bottom left of FIG. 2. By way of example, this telephone station set does not include a message retrieval display. To retrieve the message, the principal can call the covering user, who has a telephone station set equipped with a display, or message center 104.

Telephone Station Set for Covering User

Figure 3:
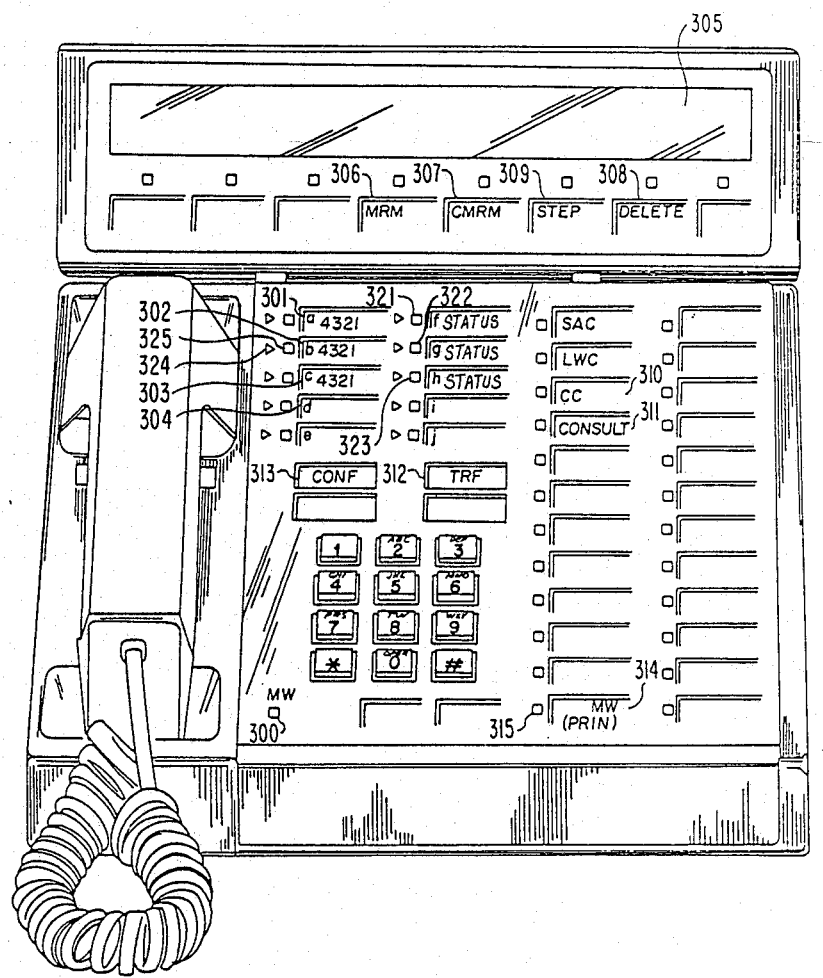

FIG. 3 shows a telephone station set typically used by a secretary. It includes essentially the same features as the telephone station set in FIG. 2. In addition, this telephone station set embodies several features especially pertinent for a secretary. One such feature is an illustrative 40 character alphanumeric display module 305 used to retrieve leave word calling and coverage callback messages, as well as message center messages that will fit the 40 character display. Messages for this telephone station set (e.g., the secretary) can be obtained by operating the MESSAGE/RETRIEVAL MODE (MRM) button 306. If the telephone station set is included in the coverage path of one or more principal telephone station sets, then messages for those principal telephone station sets can be obtained by operating a COVERAGE MESSAGE RETRIEVAL MODE (CMRM) button 307. After a message is displayed, the message may be erased from storage by an operation of DELETE button 308. Otherwise, the message remains stored for retrieval at a later time. An operation of STEP button 309 causes the next stored message or a no further message indication to be displayed.

The telephone station set of FIG. 3 is also equipped with three principal status indicators 321-323, one for each of corresponding call appearances 301-303. When a call coverage call arrives at the telephone station set of FIG. 3 on line appearance 302, for example, I-use lamp 324 is lit steady to indicate a call appearance that has been selected by the covering user. Status lamp 325 is lit flashing to indicate an incoming call coverage call in the ringing state. The associated principal status indicator 322 indicates the state of the principal's line by, for example, a steady indication to represent a call forward-unanswered call or a flashing indication to represent a call forward-busy line call. The covering user also receives an alphanumeric message on display 305 to indicate the identity of the principal associated with this covered call. Thus, the covering user receives information on both the identity of the principal and the busy/idle status of he principal's line. The following description provides a detailed view of how the business communication system relays the principal status information to the covering user's telephone station set.

An alternative to principal status indicator 322 is the use of display 305 to provide a principal busy status indication. The above-mentioned alphanumeric message on display 305 can indicate not only the identity of the principal but also the principal busy status.

In addition to the above-described buttons, the telephone station set of FIG. 3 illustratively includes a coverage callback (CC) button 310 and a consult button 311. Both buttons are operative only with respect to a call which is being covered at the station. The coverage calback button causes a leave word calling type message to be generated and stored. The principal is requested to call the calling party instead of the covering party as in the case of a leave word calling button operation at the covering telephone station set.

The consult button allows the covering party to call the principal's telephone station set for which a covered call was intended on a priority basis to consult with and/or return the call back to the principal. To activate this feature, the covering agent depresses first either a transfer button 312 or a conference button 313 to put the covered call on hold. This action also causes the system to select an idle call appearance. An operation of the consult button now causes a call to be placed automatically to the principal telephone station set on the selected call appearance. The consult call is not subjected to call coverage redirection because of its priority status. A subsequent operation of the conference or transfer buttons connects the calling, principal and covering telephone station sets or the calling and principal telephone station sets, respectively.

Any of the nondedicated buttons on a covering telephone station set, such as button 314, may be used for message waiting (MW) for a principal's telephone station set. In such a case, the button s nonfunctional and the associated lamp, such as 315 is lit whenever the message waiting lamp on the principal's telephone station set is lit.

Table Description

Figure 4:
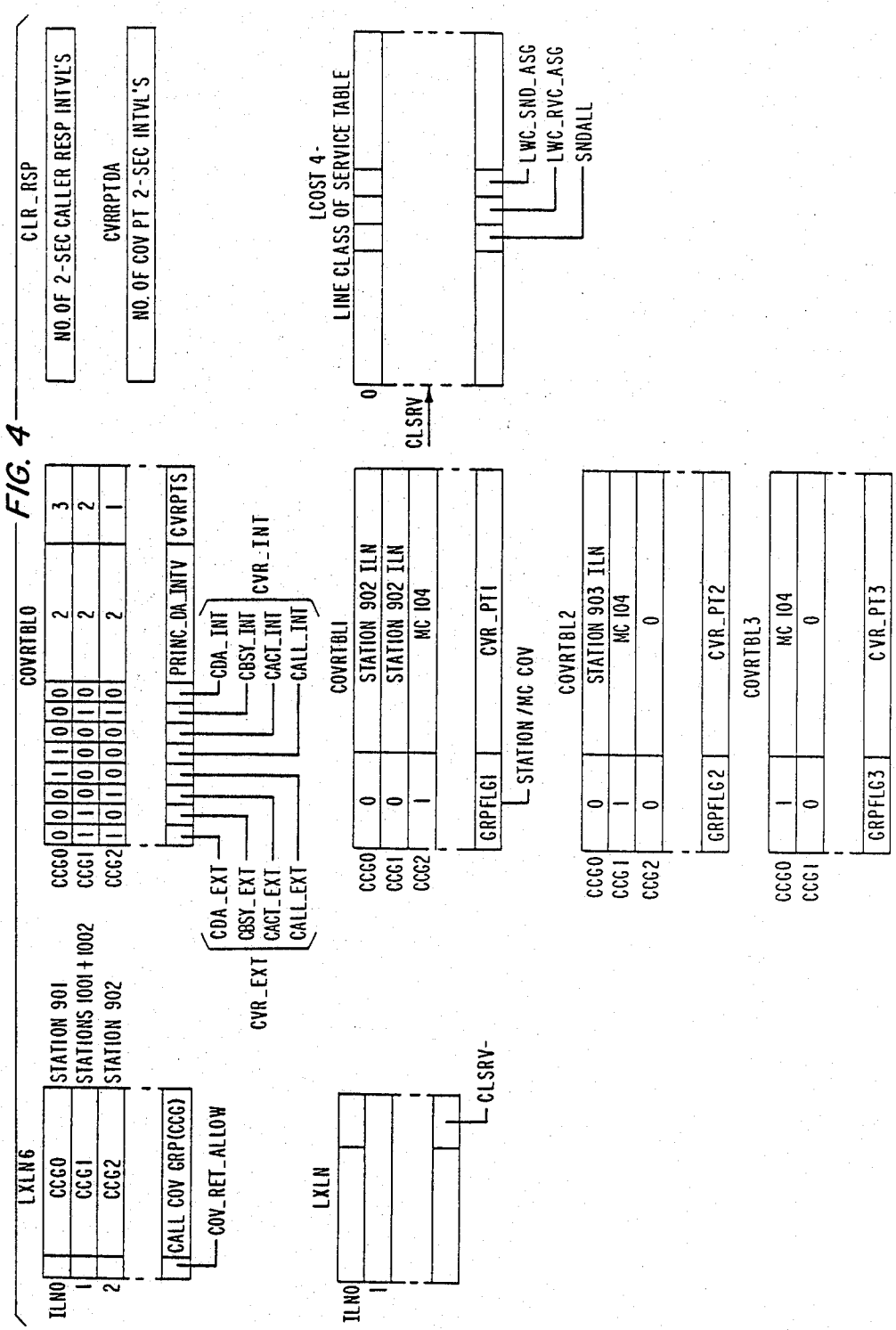
FIGS. 4 through 8 shown pertinent data table layouts used by the program to control the system of FIG. 1.

FIGS. 4 through 8 show certain data tables used by the business communication system in processing calls. In view of our simplifying assumptions that telephone station sets 100-1 to 100-N are equipped with one line which might have plural call appearances, the terms "station" and "station line" are used interchangeably in the remainder of this document. FIG. 4 contains parameter tables defining system parameters defined by the system customer. A given station line in the business communication system for which coverage is defined is assigned to a call coverage group (CCG). Any number of coverage groups may be defined by the customer. Table LXLN6 contains a storage word for each call appearance in the system defining the coverage group applicable to that call appearance. A call appearance is identified by an internal line number (ILN) which is arbitrarily assigned. Thus, for example, one call appearance of telephone station set 100-1 (see FIG. 9) is assumed to be assigned to internal line number 0, which references the first word in table LXLN6 and is assigned to call coverage group 0. Every word in table LXLN6 pertaining to a call appearance on the same station line would have the same call coverage group number stored therein. Each word of table LXLN6 also contains a flag COV-RET-ALLOW that defines whether or not any covering station in the call coverage group for this principal station line with a display module is allowed to retrieve the principal's leave word calling messages.

A second table LXLN contains a word for each internal line number. Each word contains a line class of service indicator CLSRV for the appropriate station line. The line class of service indicator contains a number defining a feature capability for the line. The line class of service indicator is used as an index to address a line class of service table LCOST4 which specifically defines certain capabilities for a line. Only capabilities pertinent to this disclosure are shown in line class of service table LCOST4. Specifically, a flag SNDALL defines whether or not the send all calls feature is allowed to be activated for a given line. A flag LWC_SND_ASG defines whether or not the leave word calling feature can be activated from a line, and a flag LWC_RCV_ASG defines whether a line is authorized to have leave word calling messages stored for the line as a principal.

Coverage Tables

Four coverage tables COVRTBL0 through COVRTBL3 are shown. Each is indexed by a call coverage group number obtained from table LXLN6. Coverage table COVRTBL0 contains the call coverage criteria applicable to a station assigned to an applicable call coverage group. Each word of the coverage table contains two groups of criteria. The first group CVR_INT pertains to criteria applicable to internal calls (calls from stations served by the system). Within this group are a CDA_INT flag meaning "cover internal calls when the principal station is not answered", CBSY INT meaning "cover internal calls when the station is busy", CAC_T_INT meaning "cover internal calls when the station is active", and CALL_INT meaning "cover all internal calls". The second group of criteria CVR_EXT contains flags corresponding to the internal call flags above but pertaining to external calls (calls from stations not served by the system) to a principal station.

In addition, each word of coverage table COVRTBL0 contains in entry CVRPTS the number of coverage stations defined for the respective call coverage group and in PRINC_DA_INTV the number of 2-second intervals during which to ring a principal station before redirecting a call to a coverage if the principal station has a cover on doesn't answer (D/A) (external or internal) criterion.

Coverage table COVRTBL1 contains information pertaining to the first covering station for each of the call coverage groups. A flag GRPFLG1 contains a 1 if the first covering station is located in a message center (MC) and a 0 if the first covering station is an individual station.

In addition, each word in coverage table COVRTBL1 has an indicator CVR_PT1 containing the internal line number of the first covering station, or a message center number, such as 104, if the covering station is part of a message center. If no covering station is defined for the call coverage group, CVR_PT1 contains 0. Coverage tables COVRTBL2 and COVRTBL3 contain the same information as COVRTBL1 for the secondary and tertiary covering stations (if any) for each of the call coverage groups.

As will be described, before a call is redirected to coverage, the calling party is alerted of this fact and a time interval called the caller response interval (CRI) is provided thereafter and before the call is actually redirected to allow the calling party time to activate a leave word calling message, for example, in lieu of going to coverage. The number of 2-second intervals selected by the customer as the caller response interval are stored in table CLR_RSP.

Once a call has been redirected to coverage, the call is allowed to ring at a covering telephone station set for only a prescribed time interval before the call is redirected to the next covering telephone station set (if any). Data to indicate the number of 2-second intervals forming this interval is stored in table CVRRPTDA.

Trunk Tables

Figure 5:
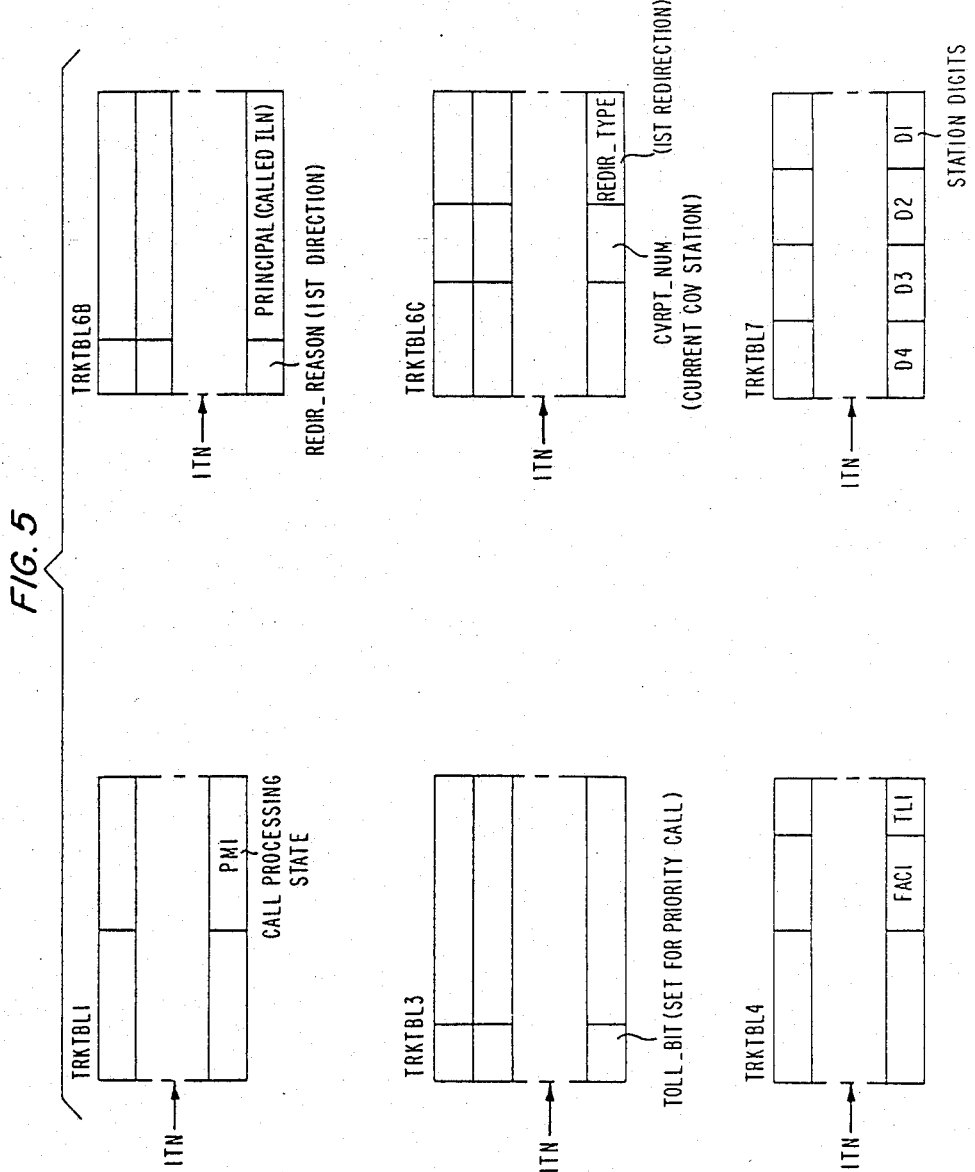

FIG. 5 shows a number of tables collectively referred to as the trunk tables. Each trunk table is indexed by an internal trunk number (ITN). The collection of words from each trunk table pertaining to a given internal trunk number forms a trunk record. Every call in the system is associated with an individual trunk record. Only items of interest to this disclosure are shown in each of the trunk tables.

Trunk table TRKTBL1 contains an indicator PM1 (call processing state mark) which contains encoded information defining the current call processing state of an associated call in the system. Trunk table TRKTBL3 contains a priority flag TOLL_BIT. A call is marked as a priority call by setting TOLL_BIT whenever it is desirable to avoid the possibility that the call will be redirected to coverage. One such type of call is a consult call from a covering station to a principal station during a covered call for the principal station. In such a case, the consult call should not also be redirected to coverage if a principal station coverage criterion happens to be satisfied. Trunk table TRKTBL4 contains a flag TL1 specifying whether a call is an internal or an external call. For an internal call, an item FAC1 in trunk table TRKTBL4 contains the internal line number of a calling internal station. A similar arrangement is provided for item FAC1 for external calls. Trunk table TRKTBL6B contains an item PRINCIPAL which stores the internal line number of a station called as a principal station. If a call has been redirected to coverage, an item REDIR_REASON contains encoded information specifying which coverage criterion was satisfied causing the redirection.

Trunk table TRKTBL6C contains an item REDIR_TYPE which contains 0 if a call has not been redirected or a number identifying whether other call options such as call forwarding or call pickup has occurred on the call. In addition, trunk table TRKTBL6C contains in entry CVRPT-NUM, the sequence number, i.e., primary, secondary or tertiary covering point, of a current covering station, if applicable, on a call. Trunk table TRKTBL7 contains the dialed digits D1 through D4 of a called station directory number.

Figure 6:
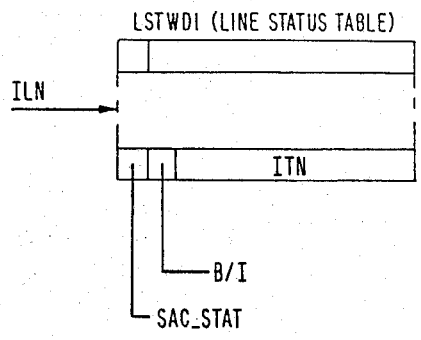

FIG. 6 shows a line status table LSTWD1 indexed by internal line number (ILN). Each word contains a SAC_STAT flag set to 1 if a send all calls feature has been activated. In addition, each word contains an item TRKNUM which stores the internal trunk number index to the trunk tables for a call pertaining to a given station.

Figure 7:
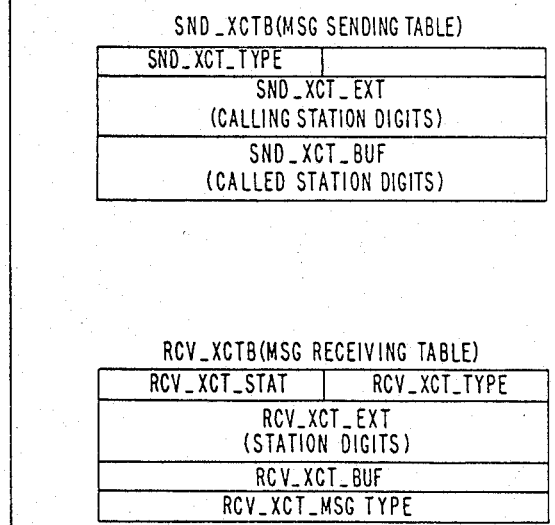

FIG. 7 shows tables used to transfer leave word calling, coverage callback and message center related information between control processor 101 and applications processor 103 of FIG. 1 via the data channel interface unit (DCIU) 110. Message sending table SND_XCTB contains an item SND_XCT_TYPE which stores an encode describing the type of information transmitted to applications processor 103. Four types of transmittals are of interest here: (1) a leave word calling or coverage callback message being sent to applications processor 103 for storage; (2) a request to cancel a leave word calling or coverage callback message pertaining to specified calling and principal stations; (3) a leave word calling or coverage callback message retrieval request; or (4) a message delete request. A cancel request removes messages from storage before a principal has retrieved it. A delete request removes a message after display. For leave word calling and coverage callback message storing, deleting and canceling transmittals, item SND_XCT_EXT contains the directory number of the station requesting callback from the principal station and item SND_XCT_BUF contains the directory number of the principal station. Since leave word calling and coverage callback messages are predefined types of callback request messages, no message text is sent to applications processor 103. For message retrieval requests, only the principal (or requesting) station need be identified in SND_XCT_EXT.

Message receiving table RCV_XCTB is used to transmit both leave word calling or coverage callback messages and in certain cases message center messages from applications processor 103 to control processor 101 for display at the appropriate principal display modules. The table is also used to transmit automatic message waiting lamp update information for principal stations. Item RCV_XCT_TYPE contains encoded information identifying whether a given transmittal contains a message, whether the included message is the last message for a station, or whether there are no messages. The principal station is identified in item RCV_XCT_EXT. RCV_XCT_TYPE also identifies a message waiting update transmittal. In this case, item RCV_XCT_STAT contains an on/off state for updating the message waiting lamp for the principal station. Encoded information in RCV_XCT_MSGTYPE identifies whether the transmittal is a leave word calling or coverage callback message or a message center message. Any message text, such as from an message center 104, is stored in RCV_XCT_BUF.

A given station may have up to three appearances of its message waiting (MW) lamp. This allows a principal station to have a message waiting lamp and for up to two other stations and for the principal station. Message waiting lamps on multifunction stations are updated by sending control signals directly to the stations. Provision is also made for stations not equipped with multifunction buttons to be equipped with message waiting lamps. In this case, message waiting lamps are controlled from the associated station line circuits which have wiring to the lamps.

Figure 8:
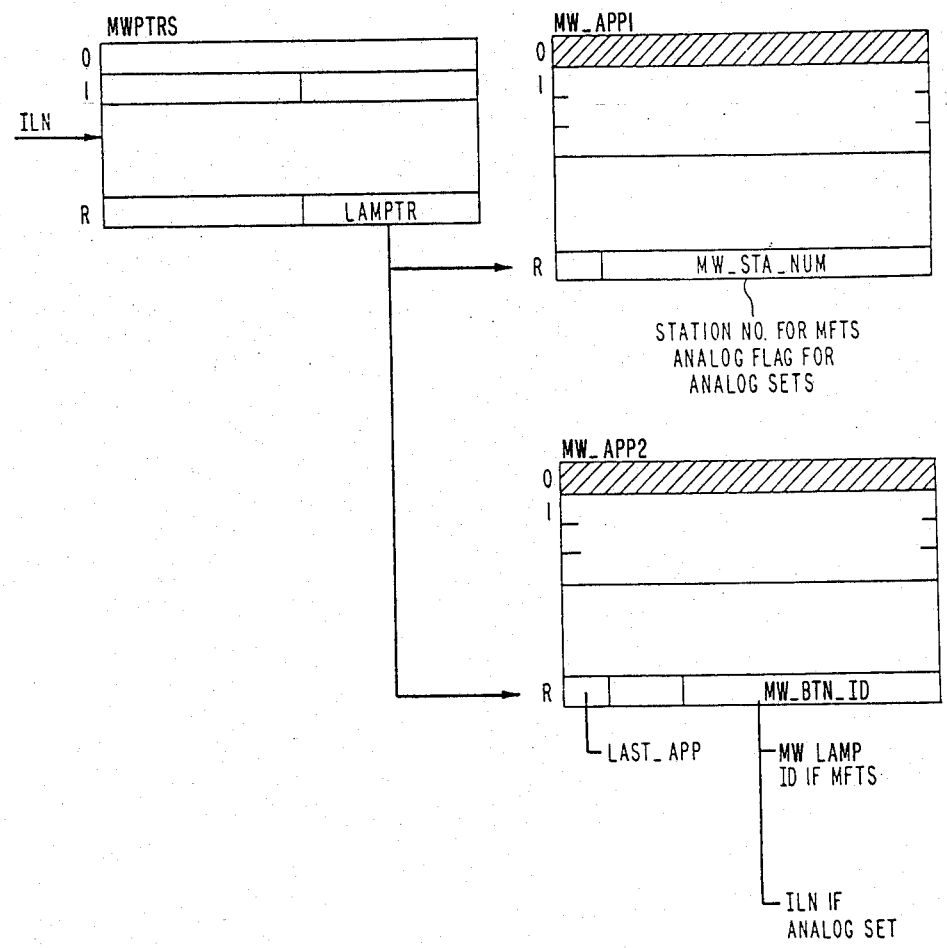

The tables in FIG. 8 allow the automatic update of all message waiting lamp appearances on the stations. Table MWPTRS is indexed by the internal line number of a telephone station in response to a lamp update transmittal from applications processor 103 to retrieve an item LAMPTR. LAMPTR points to the appropriate location in tables MW_APP1 and MW_APP2 for the principal station. These tables may have 1, 2 or 3 words per station corresponding to the number of appearances of the principal station message waiting lamp. This is illustrated by entry 1 in tables MW_APP1 and MW APP2, which is shown to have 3 words for 3 lamp appearances, and by entry R which has only one word for a single lamp appearance. A single lamp appearance would appear in most instances on its principal station. An item LAST_APP in table MW_APP2 flags the last entry in the table pertaining to any given station line. Item MW_STA_NUM in table MW_APP1 contains a station number for multifunction button stations or a flag for other stations. If MW_STA_NUM identifies a multifunction station, MW_BTN_ID contains a message waiting lamp identification by means of which the lamp may be controlled. Otherwise, MW_BTN_ID contains the internal line number of a non-multifunction station, by means of which the appropriate line circuit may be addressed to control the message waiting lamp.

Program Description

Figure 9:
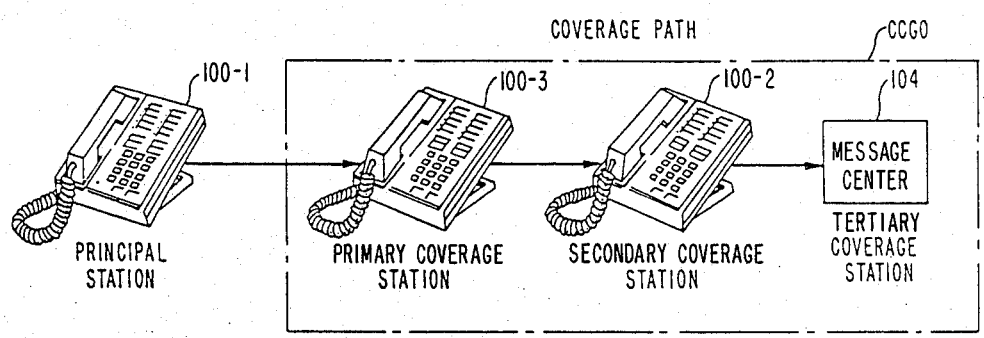
FIGS. 9, 10 and 11 symbolically illustrate certain ones of the stations in their status as principal stations and illustrative call coverage paths for each of the principal stations.
Figure 10:
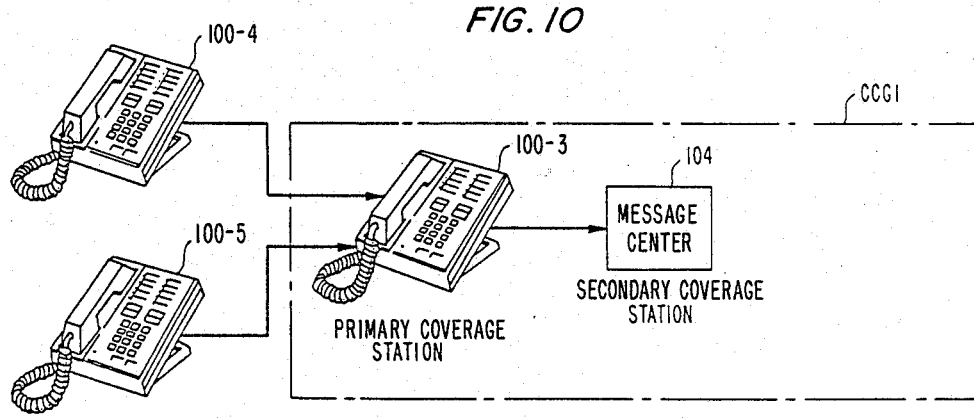
Figure 11:
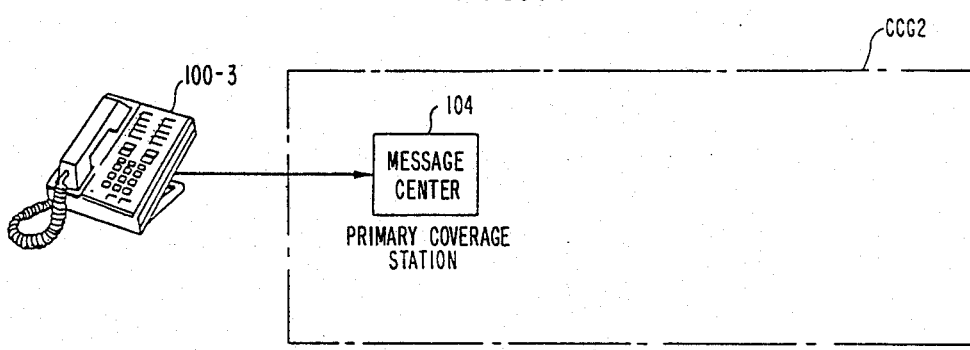

FIGS. 9 through 11 show illustrative ones of stations 100, here identified as 100-1, 100-3, 100-4 and 100-5, in their status as principal stations and illustrative call coverage group (CCG) assignments for these principal stations. These assumed assignments are used herein as examples for discussing the operation of the system. In FIG. 9 telephone station set 100-1 is assigned to call coverage group 0. Call coverage group 0 consists of telephone station sets 100-3, 100-2 and message center 104 as the primary, secondary and, tertiary covering station points, respectively.

Telephone station sets 100-4 and 100-5 are assigned to call coverage group 1, shown in FIG. 10. Call coverage group 1 consists of only two covering station points. The primary covering station point is telephone station set 100-3, which is also the primary covering point in call coverage group 0. The secondary covering station point in call coverage group 1 is message center 104. Telephone station set 100-3, although a covering station in call coverage groups 0 and 1, also has a status as a principal telephone station set.

In accordance with the above assumed call coverage arrangement, calls to telephone station sets 100-1, 100-4 and 100-5 will first be covered by telephone station set 100-3, if available. Calls to telephone station set 100-1 will be secondarily covered by telephone station set 100-2 if telephone station set 100-3 is unavailable, and finally by an operator at message center 104. Calls to telephone station sets 100-4 and 100-5 will be secondarily covered by message center 104 if telephone station set 100-3 is unavailable. Calls to telephone station set 100-3 as a principal station will be covered by message center 104.

The data shown in call coverage tables LXLN6 and coverage tables COVRTBL1 through COVRTBL3 in FIG. 4 illustratively set forth the above coverage arrangement for call coverage groups 0 and 1. In addition, as shown in coverage table COVRTBL0, it is assumed for illustration that all internal and external calls to call coverage group 0 principal stations are immediately covered (CALL_INT and CALL_EXT). All external calls to call coverage group 1 stations are covered when the stations are busy or not answered and internal calls are covered when stations are busy (CBSY_EXT, CBSY_INT, CDA_EXT).

Call Coverage

For purposes of illustration, consider an internal call from telephone station set 100-4 to telephone station set 100-1. FIG. 9 shows that telephone station set 100-1 has a coverage path consisting of telephone station sets 100-3, 100-2 and message center 104. Recall that telephone station set 100-1 has elected to have all internal and external calls covered immediately. Assume that primary covering telephone station set 100-3 is unattended.

Figure 12:
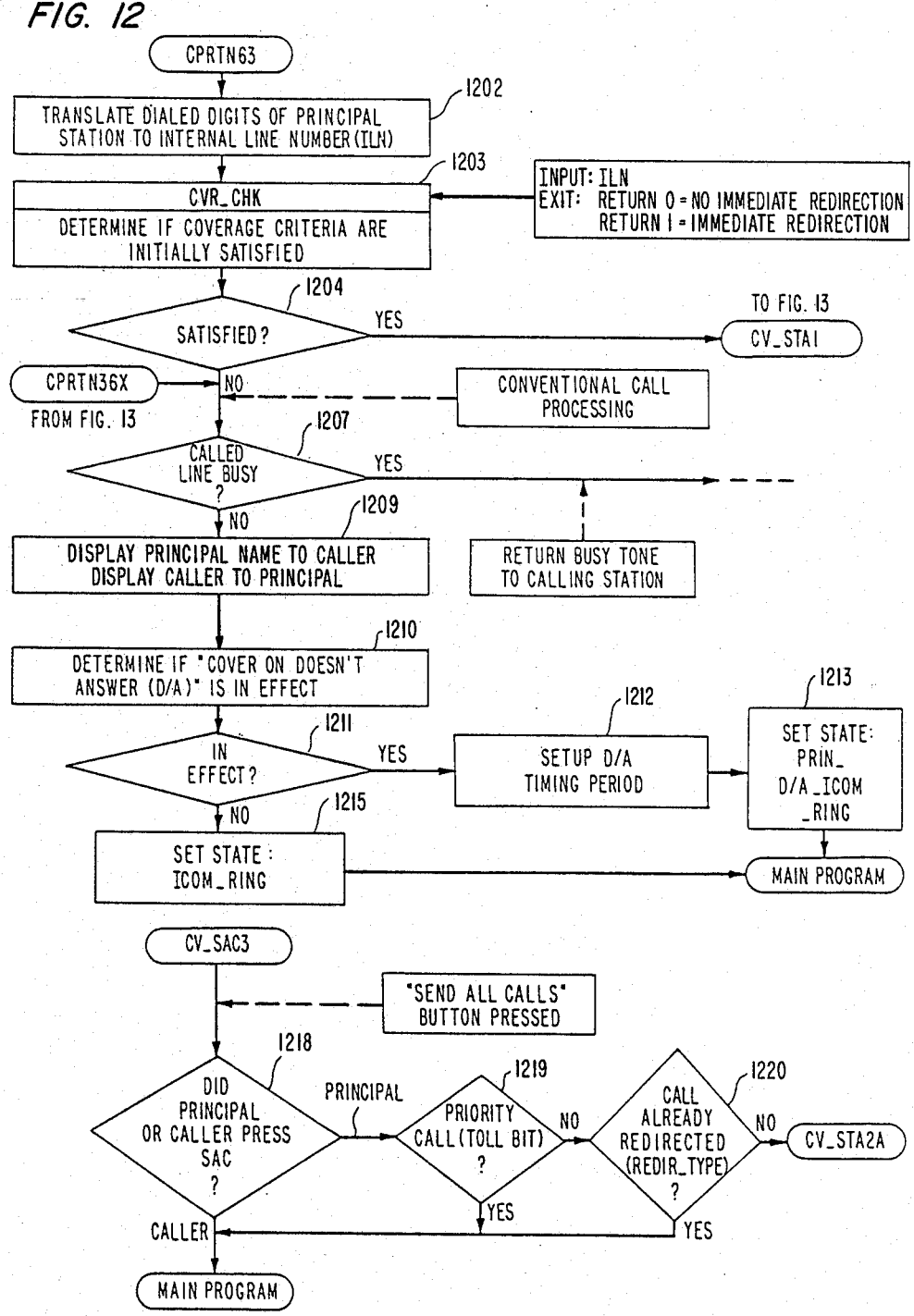
FIGS. 12 through 16 illustrate in flow diagram form, the operational steps taken by the business communication system to provide the principal busy status indication on covered calls.

FIG. 12 depicts the program (CPRTN63) entered in response to the dialing of the telephone station set 100-1 number from telephone station set 100-4. The dialed station number is translated at step 1202 into the internal line number (ILN) of principal telephone station set 100-1. Program CPRTN63 next calls the CVR_CHK subroutine at step 1203 to determine if any coverage criterion is initially satisfied. Subroutine CVR_CHK returns a zero if the coverage criteria checked by the subroutine are not satisfied. If one criterion is satisfied, CVR_CHK returns a one.

Figure 13:
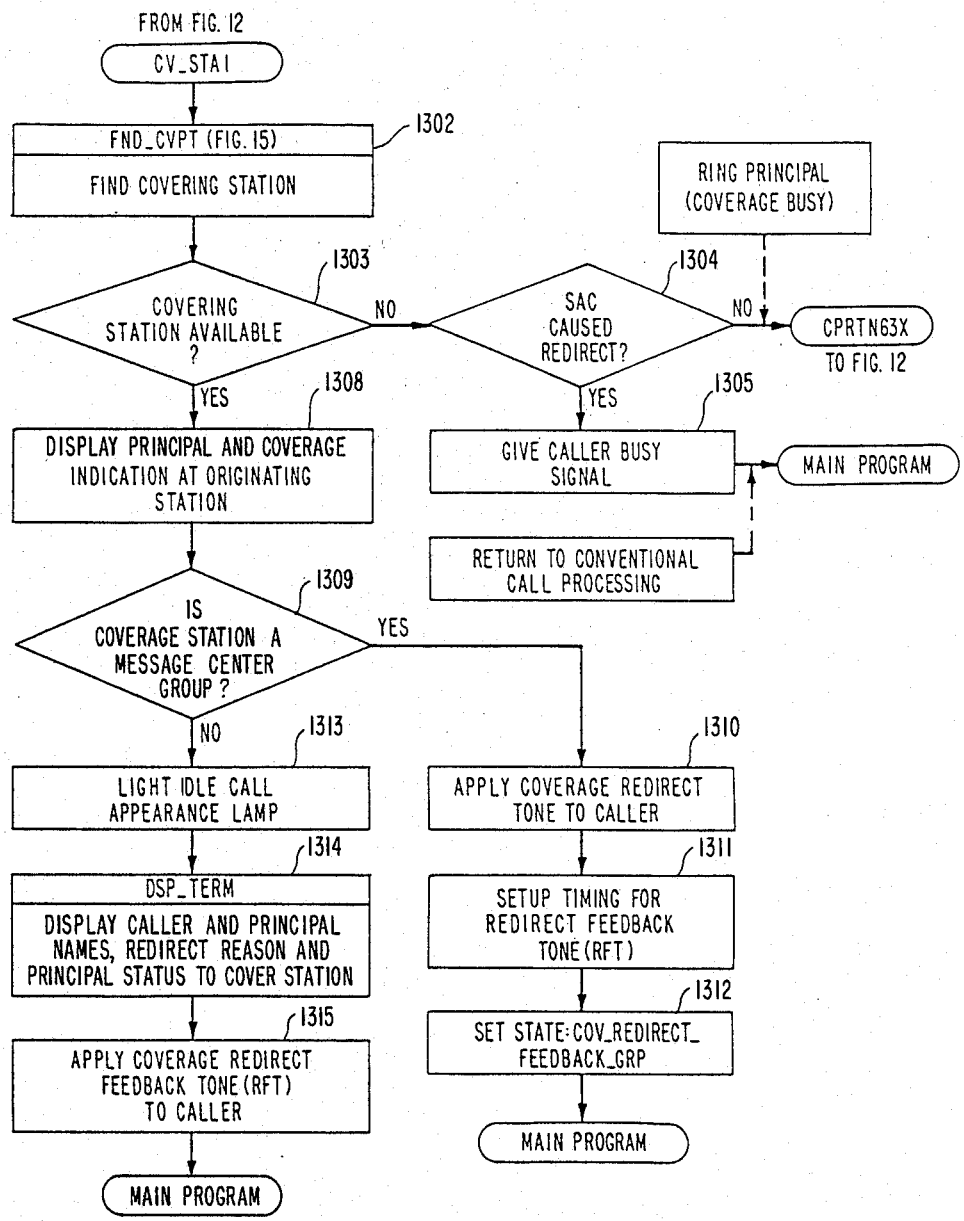

In the example call, subroutine CVR_CHK exited 1 to the calling program in FIG. 12. CVR_CHK also returns the call coverage group number 0 assigned to the principal station 100-1. Decision 1204 determines from the return 1 that some immediate coverage criterion are satisfied and transfers program control to subroutine CV_STA1 (FIG. 13).

Subroutine CV_STA1 first executes at step 1302 the subroutine FND_CVPT (depicted in FIG. 15) to locate an available covering station, if any, for telephone station set 100-1.

Figure 15:
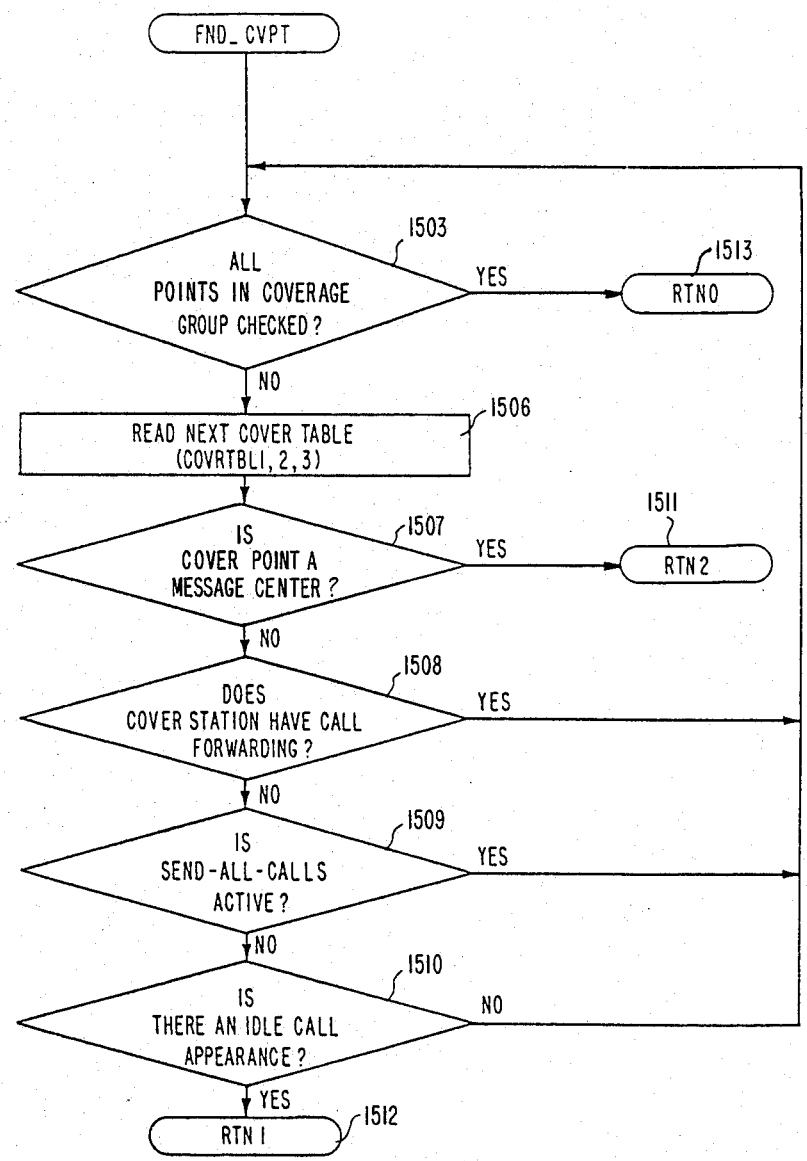

With reference to FIG. 15, FND_CVPT first sets up a loop in step 1503 to test in sequence the coverage tables COVRTBL1, COVRTBL2 and COVRTBL3 to locate an available covering station. Step 1506 reads the appropriate word, determined by the CCG number, of one of the cover tables COVRTBL1, 2 or 3 (see FIG. 4) as indicated by the loop. The first assigned covering station in COVRTBL1 is examined first. Group flag CRPFLG1 of the read word is evaluated at decision 1507 to determine if the covering station is in a message center. The first covering station 100-3 for station 100-1 is not in a message center. Subroutine FND_CVPT therefore makes three checks to discover if the station is available to cover the call to the principal station. If the covering station has call forwarding or send all calls set (decisions 1508, 1509) or if there is no idle call appearance at the station (1510), the station is considered unavailable and FND_CVPT repeats the loop to check the next cover station's status. It is recalled that for this example, it is assumed that covering station 100-3 is temporarily unattended. However, the send all calls feature is inadvertently not activated for this covering station. The program therefore considers station 100-3 to be available and returns at step 1510 to the calling program at step 1303 with the number of an idle call appearance on station 100-3.

Figure 14:
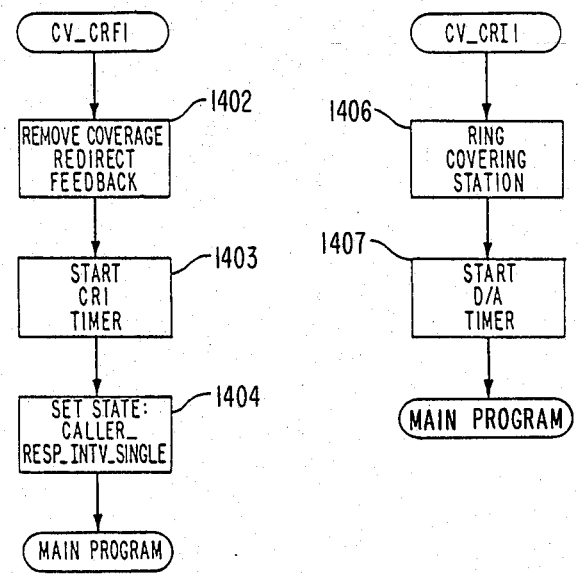

CV_STA1 progresses from decision 1303 to step 1308 which displays the name of the principal party and a coverage indication on the display module (if any) at the originating station 100-4. Since covering station 100-3 is not in a message center, step 1309 causes the execution of step 1313 where the idle call appearance on station 100-3 is seized and the associated lamp lit. Ringing of covering station 100-3 is not yet begun, however, until after expiration of the caller response interval (CRI) mentioned earlier and described below. Subroutine DSP_TERM (1314) (not shown in detail) is next called to display the caller and principal names and the reason for redirection taken from REDIR_REASON on the display module, if any, of covering station 100-3. At this point in the process, a redirect feedback tone (RFT) is applied to the calling station b step 1315 to alert the caller at station 100-4 that the call is being redirected. The main program is then entered and when the redirect feedback tone times out routine CV_CRF1 in FIG. 14 is called.

The first step (1402) of CV_CRF1 removes the redirect feedback tone. Another timed interval is now begun by step 1403 to measure the caller response interval (CRI). The length of the caller response interval is stored as a number (of 2-second periods) in table CLR_RSP shown in FIG. 4. This interval allows time for the caller to take action if he does not wish to talk to a covering party. For example, the caller may abandon the call. The caller may wait out the caller response interval so the call can be covered at station 100-3. The caller may also activate leave word calling which automatically leaves a message for the principal.

Assume for the example that the caller decides to wait out the caller response interval and allow the call to be covered. When the caller response interval times out, subroutine CV—CRI1 is entered from the main program (see FIG. 14). Step 1406 of subroutine CV—CRI1 begins the ringing of covering station 100-3. At this point, step 1407 starts a timer that establishes how long station 100-3 will be rung before the call is redirected again to the next covering station, if any. The amount of time allowed for a covering station to answer before the program checks for another cover station is stored as a number of 2-second periods in table CVRRPTDA shown in FIG. 4 and routine CV—CRI1 exits to the main program to await covering station answer or a timeout. Since it is assumed that covering station 100-3 is unattended, when the D/A timer runs out, subroutine FND—CVP in FIG. 15 is entered.

Subroutine FND—CVPT continues the loop previously setup to find the next cover station. This is telephone station set 100-2 shown in FIG. 9 and item CVR—PT2 of table COVRTBL2 pertaining to call coverage group 0. Routine FND—CVPT returns a 1 at terminal 1512. The 1 returned indicates that a covering point is available and that the covering telephone station set is 100-2. Call alerting is stopped at the last covering station 100-3 and the main program is entered.

Control processor 101 uses item CVR—PT2 from table COVRTBL2 to identify telephone station set 100-2 as the coverage point for the incoming call directed to telephone station set 100-1. Control processor 101 transmits control signals via digital communication channel 114 and input/output interface circuit 115 to switching network 106. In response to these control signals, switching network 106 establishes a communication connection between calling telephone station set 100-4 and the call coverage point, telephone station set 100-2. Control processor 101 transmits a display message, identifying the principal associated with telephone station set 100-1 and the reason for the redirected call, to display 305 of telephone station set 100-2 (assumed to be shown in FIG. 3). If covering telephone station set 100-2 is not equipped with a display, the status lamp 325 will just be activated to indicate an incoming call.

Control processor 101 transmits additional control messages via digital communication channel 114, input/output interface circuit 115, port circuit 105-2 to telephone station set 100-2 to light principal status indicator 322 associated with this redirected call. Principal status indicator 322 is lit steady to indicate that the principal's telephone station set 100-1 is active (off-hook on one or more line appearances).

Thus, when the call coverage call arrives at covering telephone station set 100-3 (FIG. 3) on line appearance 302, for example, I-use lamp 324 is lit steady to indicate a call appearance that has been selected by the covering user. Status lamp 325 is lit flashing to indicate an incoming call coverage call in the ringing state. The associated principal status indicator 322 indicates the state of the principal's line by, for example, a steady indication to represent a call forward-unanswered call or a flashing indication to represent a call forward-busy line call. Thus, the covering user receives information on both the identity of the principal and the busy/idle status of the principal's line.

An alternative to principal status indicator 322 is the use of display 305 to provide a principal busy status indication. The above-mentioned alphanumeric message on display 305 can indicate not only the identity of the principal but also the principal busy status.

Principal Status Indicator Update

Assume that the covering user at telephone station set 100-2 places the calling party at telephone station set 100-4 on hold. Control processor 101 periodically scans all telephone station sets 100-1 to 100-N to determine their busy/idle status. Control processor 101 uses this status information to update the principal status indicator on covering telephone station set 100-2

Figure 16:
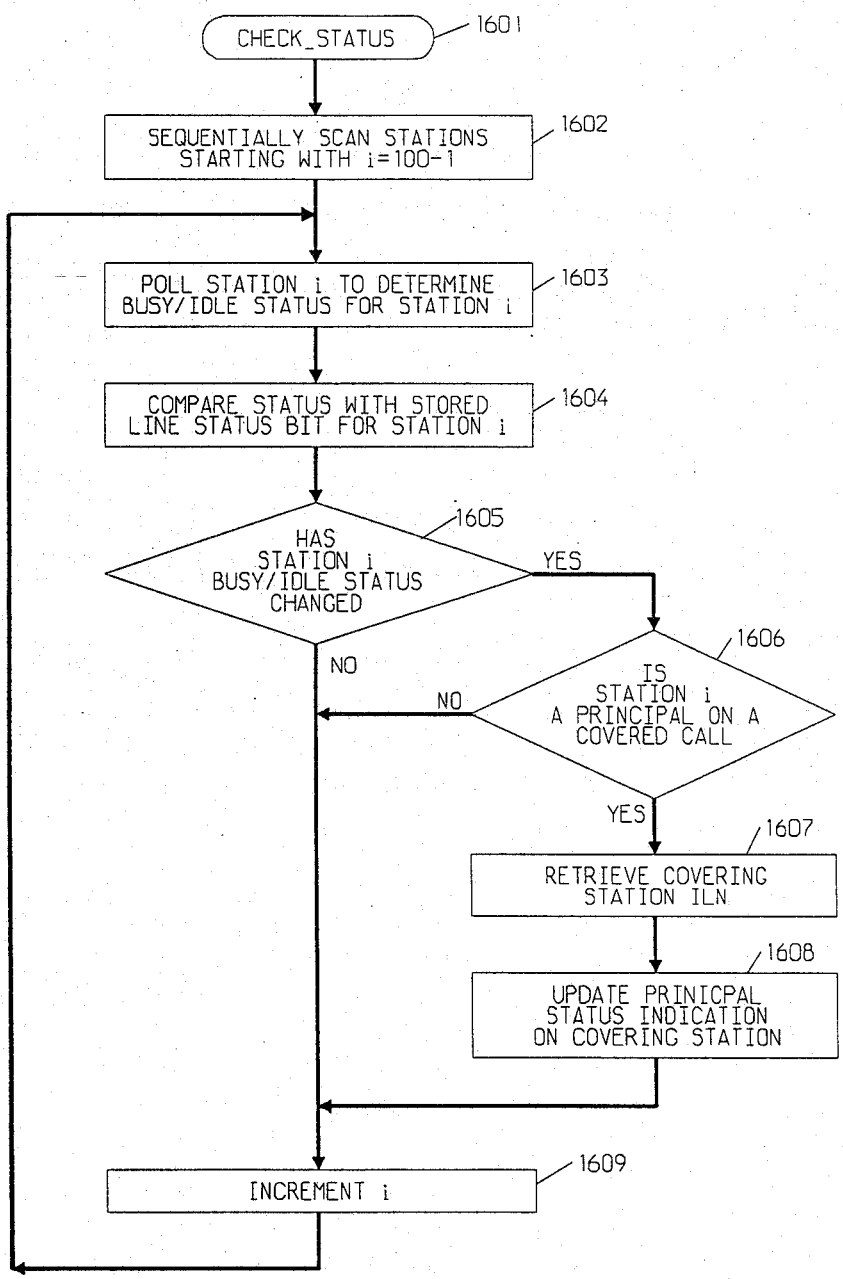

The principal status indicator update process is illustrated in FIG. 16. Control processor 101 periodically initiates the line status update task which has entry point 1601 on FIG. 16. The initial step in this process is at step 1602 where the sequential scanning of telephone station sets 100-1 to 100-N is initiated by setting i=100−1. CPU 107 at step 1603 polls station 100-1 by transmitting a control message via digital communication channel 114, input/output interface circuit 115 to port circuit 105-1. The control message in well-known fashion querys port circuit 105-1 on the busy/idle status of the various line appearances on associated telephone station set 100-1. Assume that all line appearances on associated telephone station set 100-1 are idle. Port circuit 105-1 transmits a response control message to CPU 107 to indicate the busy/idle status via input/output interface circuit 115 and digital communication channel 114. At step 1604, CPU 107 reads the line status bit from line status table LSTWD1 which is stored in memory 108. The line status bit B/I is compared with the busy/idle status reported to CPU 107 by port circuit 105-1. CPU 107 at step 1605 determines if the reported status matches the stored status. If there is no change, CPU 107 proceeds to step 1609 where i is incremented. This subroutine then returns to step 1603 for the next iteration.

If the busy/idle status of telephone station set 100-1 has changed, as is assumed here, CPU 107 advances to sept 1606 where the principal status of telephone station set 100-1 is investigated. CPU 107 scans trunk table TRKTBL6B (FIG.5) to determine whether telephone station set 100-1 is a principal on a covered call. If trunk table TRKTBL6B contains telephone station set 100-1 as a PRINCIPAL entry, then CPU can obtain the trunk number ITN associated with the calling party, telephone station set 100-4. On FIG. 6, table LSTWD1 contains an association between the trunk number, ITN and the internal line number, ILN, CPU 107 can thereby obtain the identity of covering telephone station set 100-2 from this table. CPU transmits a principal status indicator update message to port circuit 105-2 associated with covering station set 100-2 via digital communication channel 114 and input/output interface circuit 115. Port circuit 105-2 forwards the received control message to covering telephone station set 100-2 which updates the principal status indication by displaying a message on display 305 or by altering the state of status lamp 325.

Thus, the covering user obtains updated principal status information with which to further process the held call. This information is forwarded to the covering user regardless of whether the covering user is the primary, secondary or tertiary coverage point.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a business communication system, a method for providing call coverage for a plurality of principal telephone station sets by a plurality of covering station sets of a predetermined call coverage path and each of said covering station sets having a plurality of pairs of indicators with a call appearance one of the indicators of each pair displaying a call appearance and a status one of the indicators of each pair capable of displaying the status of any of said plurality of principal telephone station sets, and method comprising the steps of:

determining in response to a covered call from a calling party directed to one of said principal telephone station sets the availablity of a first one of said covering station sets in said predetermined call coverage path to handle said covered call;

determining the availability of a second one of said covering station sets in said predetermined call coverage path to handle said covered call upon said first one of said covering station sets being unavailable;

routing said covered call to said second one of said covering station sets upon said second one of said covering station sets being available;

selecting one of said pairs of indicators of said second one of said covering station sets to service said covered call;

displaying the presence of said covered call at said second one of said covering station sets via the call appearance indicator of the selected pair of indicators;

initially displaying the status of said one of said principal telephone station sets via the status indicator of said selected pair of indicators thereby allowing a user of said second one of said covering station sets to assist said calling party;

continually displaying said current status of said one of said principal telephone station sets upon said calling party wanting to wait until said current status of said one of said principal telephone station sets changes to an idle status; and continuously determining the current status of said one of said principal telephone station sets thereby informing said user of said second one of said covering station sets when said covered call can be connected to said one of said principal telephone station sets by actions of said user of said second one of said covering station sets.

2. The method of claim 1 wherein each of said covering station sets further comprises an alphanumeric display and said step of intitially displaying further comprises the step of displaying the name of the principal user of said one of said principal station sets on said second one of said station sets.

3. A business communication system for providing call coverage for a plurality of principal telephone station sets in a predetermined call coverage path, and said business communication system comprising:

a plurality of covering station sets for said predetermined call coverage path and each of said covering station sets having a plurality of pairs of indicators with a call appearance one of the indicators of each pair displaying a call appearance and a status one of the indicators of each pair capable of displaying the status of any of said plurality of principal telephone station sets;

means for determining in response to a covered call from a calling party directed to one of said principal telephone station sets the availability of a first one of said covering station sets in said predetermined call coverage path to handle said covered call;

means for determining the availablity of a second one of said covering station sets in said predetermined call coverage path to handle said covered call upon said first one of said covering station sets being unavailable;

means for routing said covered call to said second one of said covering station sets upon said second one of said covering station sets being available;

means for selecting one of said pairs of indicators of said second one of said covering station sets to service said covered call;

means for displaying the presence of said covered call at said second one of said covering station sets via the call appearance indicator of the selected pair of indicators;

means for initially displaying the status of said one of said principal telephone station sets via the status indicator of said selected pair of indicators thereby allowing a user of said second one of said covering station sets to assist said calling party;

means for continually displaying said current status of said one of said principal telephone station sets upon said calling party wanting to wait until said current status of said one of said principal telephone station sets changes to an idle status; and means for continuously determining the current status of said one of said principal telephone station sets thereby informing said user of said second one of said covering station sets when said covered call can be connected to said one of said principal telephone station sets by actions of said user of said second one of said covering station sets.

4. The business communication system of claim 3 wherein each of said covering station sets further comprises an alphanumeric display and said means for initially displaying further comprises means for displaying the name of the principal user of said one of said principal station sets on said second one of said station sets.

* * * * *